Aug. 23, 1966 T. P. ANDERSON ETAL 3,267,599

FILM RECORD CARD

Filed June 2, 1965

INVENTOR.
THOMAS P. ANDERSON
ROBERT BEISPEL

BY Hill, Sherman, Meroni, Gross & Simpson ATTORNEYS 3,267,599
Patented August 23, 1966

3,267,599

FILM RECORD CARD

Thomas P. Anderson, Hubbards Woods, and Robert Beispel, Skokie, Ill., assignors to Microseal Corporation, Chicago, Ill., a corporation of Illinois Filed June 2, 1965, Ser. No. 460,802
3 Claims. (Cl. 40—158)

The present application is a continuation-in-part of our copending application entitled, "Film Record Cards and Method of Copying," Serial No. 179,643, filed on March 14, 1962, and now abandoned.

This invention is directed to film record cards and more particularly to improvements in film record cards of the type wherein microfilm strips or the like are mounted within or on a statistical card.

Many means have been devised for mounting microfilm records on statistical cards. We have devised a film record card which is very simple in design, economical in manufacture and which facilitates utilization of the film strip mounted in the card for projection or reproduction purposes.

A record card constructed according to the principles of this invention has one or more apertures formed therein and comprises transparent enveloping members disposed on opposite sides of the card and overlying the apertures. The enveloping members or sheets, if rectangular in configuration, have three edges thereof secured to the opposed surfaces of the card by means of a suitable adhesive or the like which is placed on the card along the edges of the aperture, but the fourth edges thereof are not sealed to the card although they do overlie the card. That is, the unsecured edge of each enveloping member does not terminate at the edge of the aperture. A microfilm strip may be inserted into the pocket formed intermediate the enveloping members, between one surface of the card and that portion of the transparent sheet mounted thereon which is not secured to the card surface.

Inasmuch as the unsecured edge of the transparent sheet overlies the adjacent surface of the record card, the microfilm strip is quite well protected from foreign particles and is well protected from stains and the like resulting from handling of the card. Nonetheless, since no adhesive is used on the film strip for maintaining it in its proper position within the card aperture, the strip may readily be removed from the card pocket.

Nor portion of the enveloping member is cut out to expose any surface of the microfilm mounted within the aperture.

Assuming that the film strip is translucent, it may be viewed while mounted on the record card since light may be transmitted through the transparent enveloping members. For example, a projector can be adapted to accept such a record card so that the image on the film strip can be projected on a screen to enlarge the image without necessitating the removal of the film strip from its mounted position on the card.

In addition the image on the film strip can be reproduced in a modified contact printing operation. For example, by placing a sheet of photosensitive material against one of the enveloping members and passing a light through the other enveloping member and through the film strip the image can be transferred to the photosensitive material.

Because of the refractive properties of the enveloping members however, the projected or transferred film strip image may be somewhat distorted and may tend to be vague and indefinite and lacking in clarity and precision.

According to the principles of the present invention, however, such distortion is minimized and the film strip image can be projected or reproduced with increased accuracy and definiteness.

It is, therefore, an object of the present invention to provide a film record card having one or more enveloping members mounted over an aperture formed therein, which enveloping members have optical properties tending to enhance the usefulness of record cards.

Another object of the invention is to provide a record card having an aperture formed therein and a pair of transparent enveloping members secured to the card on either side thereof to form a film strip receiving pocket therebetween in the aperture, and to construct the enveloping members from material having certain optical properties and physical characteristics whereby the image on a film strip in the pocket can be projected or reproduced with minimal distortion of the image while the strip is retained in the pocket.

Another object of the invention is to provide a film record card employing enveloping members for the card such that parallel and non-parallel light rays directed therethrough are subject to minimal deflection or refraction.

Another object of the invention is to provide a film record card employing enveloping members constructed of transparent material of a given thickness and having a given index of refraction to increase the fidelity of an image transmitted therethrough.

A further object of the invention is to prevent light rays from passing through the enveloping members, in the first instance, which are not within a given angle of a line normal to the plane of the enveloping members to thus reduce distortion of an image transmitted therethrough.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Figure 1:
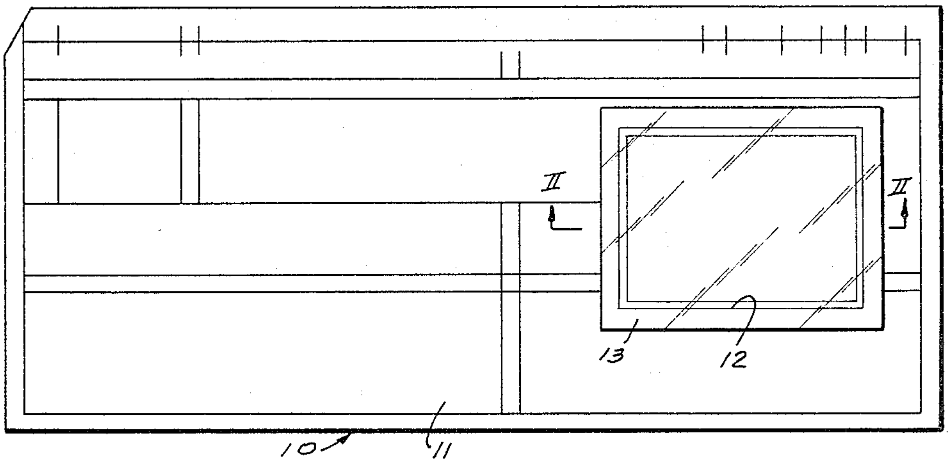
FIGURE 1 is a front elevational view of a film record constructed in accordance with the principles of the present invention.

Referring to FIGURE 1, a film record card 10 is illustrated as comprising the usual statistical card 11 having a rectangular aperture 12 formed therein.

Transparent enveloping members or sheets 13 and 14 are rectangular in configuration and are mounted on front and rear surfaces 11*a* and 11*b*, respectively, of the card 11 so that they overlie the aperture 12. The rear sheet 14 may be secured to the rear surface or wall 11*b* around the entire periphery of the aperture 12 by means of a suitable adhesive coating.

Figure 2:
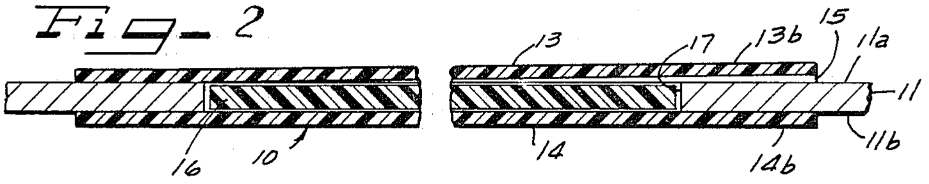
FIGURE 2 is a vertical sectional view taken along lines II—II of FIGURE 1.

Referring to FIGURE 2, however, the enveloping members 13 and 14 are illustrated as being mounted over the aperture so that their edges overlie portions of the card defining the aperture 12 but in the case of member 13 only three edges thereof are secured to the respective surfaces of the card, and an unsecured portion of the enveloping member 13*a* overlies the card. Since the unsecured edge portion 13*a* is affixed to the record card only at its ends, a slight gap 15 may be formed between the enveloping members 13 and the card 11. In fact, this gap would be very small and may not exist at all. This, of course, would be dependent upon the manner in which the enveloping member is mounted on the record card and on whether the record card is disposed in a completely flat plane.

A film strip 16 may be inserted through the gap 15 into a film pocket 17 formed between the enveloping members 13 and 14 in the aperture 12 and once the film strip is disposed within the pocket, as illustrated in FIGURE 2, it will be protected from substantially all atmospheric impurities as well as from stains caused by handling and the like. Since the enveloping members 13 and 14 are transparent, light may be transmitted through the enveloping members as well as the film strip 16 if it is desired to project the film image on a screen or to make a reproduction of the image on the film strip by photographic means. Thus, removal of the film from the card for these purposes is not necessitated.

In addition, practically all foreign particles will be prevented from entering the pocket 17 since the edge portions of the enveloping members which are not secured to the card 11 substantially overlie the card and are normally maintained in contiguity with the respective surfaces of the card due to the fact that they are maintained relatively taut by the secured edges thereof.

The film strip 16 is thus secured within the card 11 in such a manner that it may be readily viewed or reproduced at will without necessitating its removal from the card while at the same time it is protected from damage but is not itself physically altered since no adhesives are applied to the film strip. Furthermore, the film 16 is protected from being accidentally damaged since it is held in coplanar relation with the card 11 by the enveloping members 13 and 14. Viewing of the film strip by light projection through the film pocket is not hampered by an edge of one or more of the enveloping members overlying the surface of the film strip as is true in some other film record cards.

As noted, we have discovered that an image formed on the film strip can be easily projected on a screen without removing the strip from the pocket 17 by merely inserting the entire card into a projector adapted to thereby receive it, and by directing light through the enveloping members 13 and 14 and the strip situated therebetween onto a conventional projection screen.

We have also discovered that the image can be reproduced by conventional photographic processes without removing the film strip 16 from the pockets 17. For example, assuming that the film strip is a microfilm negative or image carrying a photosensitive member a so-called contact printing process can be employed to transfer the image formed on the negative to an unexposed photosensitive member while the negative is retained in the film pocket of the record card.

Figure 3:
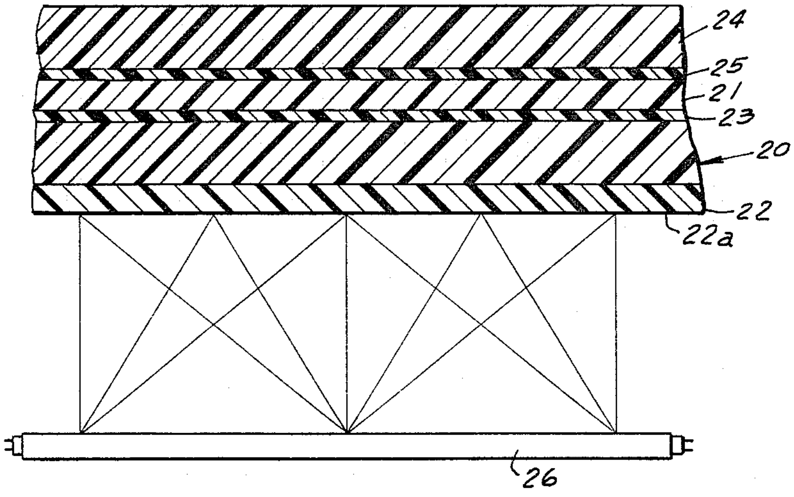
FIGURE 3 is a fragmentary vertical sectional view of a film pocket within a record card having a film strip mounted therein and a sensitized film mounted on top of one of the enveloping members and illustrating a source of light directed theretoward.

FIGURE 3 is illustrative of this process wherein is shown a film strip negative 20 lying between and contacting upper and lower enveloping members 21 and 22 respectively and with an emulsion 23 lying on the upper surface thereof. The film strip 20 may comprise the usual microfilm negative having an image formed in the emulsion 23. Lying on the upper surface of the enveloping member 21 is an unexposed film strip 24 which has an emulsion surface 25 lying in contact with the enveloping member 21. It will be understood, however, that the member 24 might be any unexposed photosensitive member such as a positive printing paper.

In the normal contact printing process, the emulsions 23 and 25 are placed in contact with one another and light rays emanating from a source of light as at 26 are directed through the film strip negative 20 and impinge on the emulsion 25 formed on the film strip 24 with the result that the image on the emulsion 23 is "transferred" to the emulsion 25 in a manner which is well known in the art.

In the prior art it has not been practical in many instances to interpose a transparent element between the source of light and the projection screen or unexposed photosensitive member while projecting or reproducing an image formed on a microfilm negative. This is because the light rays passing through the transparent element are refracted and such refraction may cause blurring of the image formed on the projection screen or the unexposed photosensitive member. Even moderate refraction of light rays directed past an opaque portion of the image on the negative may cause undesirable indefiniteness or vignetting of the image transferred to the unexposed film.

We have discovered that the enveloping members may be constructed of certain transparent material whereby not only is the distortion of a projected or reproduced image substantially reduced and almost entirely eliminated, but also is the card more durable and the use thereof greatly facilitated.

For example, we have discovered that there is a correlation between the thickness of the enveloping members which overlie the front and rear surfaces of the record card and the stacking of the cards in piles or rows. In order to attain substantial uniformity of the thickness of the card along the entire length thereof the enveloping members should be quite thin. In order to satisfactorily protect the film strip in the pocket of the card, however, the enveloping members should be quite strong and also resistant to scratches and other deformations in the faces thereof. Furthermore, the enveloping members should have a relatively low index of refraction to avoid distortion of the image on the film strip as it is projected or reproduced.

We have discovered that polyethylene terephthalate films such as "Mylar" (produced by E. I. du Pont de Nemours & Co. of Wilmington, Delaware, U.S.A.) are ideally suited for use in forming the enveloping members. Such films may have a thickness as small as 0.00025 inch and can be satisfactorily employed with thickness up to 0.0005 inch.

Mylar is a rugged, clear film having about ⅓ the strength of machine steel and having a tensile strength of 17,000 to 20,000 p.s.i. which is about twice that of cellophane and five times that of polyethylene. One of its properties is excellent resistance to acids, greases, oils and organic solvents.

Another important advantage of polyethylene terephthalate films is that magnetic ink can be readily applied and will adhere thereto. Mylar film also has a high insulation resistance and well balanced electrical properties so that placing magnetic ink on enveloping members formed of such material the members themselves can serve as a repository for additional media. This is an important factor in the formation of record cards since there is now an ever increasing desire to place more and more media on statistical cards.

Statistical cards generally have media stored thereon in the form of punchings or holes in the record card or magnetic ink applications on one or more surfaces thereof. Operators however have been prone to space the magnetic ink applications or punchings a substantial distance from the record card aperture or the enveloping member or members in order not to interfere with or damage the film pocket or the film strip contained therein.

By employing a polyethylene terephthalate film or the like which can readily receive a magnetic ink, the media storage space on one or both faces of the record card can be substantially increased. While it would be possible to apply a transparent magnetic ink across the entire face of one or both of the enveloping members, it will generally be found desirable to apply the magnetic ink only to that portion of each enveloping member which overlaps the portion of the card defining the aperture therein. Otherwise, the magnetic ink applied to that portion of the enveloping member overlying the aperture and the film strip contained therein would preclude distortion-free projection or reproduction of the image on the film strip. Of course, if distortion-free projection or reproduction of the film strip image while it is in the film pocket is not a critical factor, then magnetic ink can be applied across the entire surface of the enveloping member.

Further, since magnetic ink of the type above described generally has better output or tonal characteristics when applied to a non-absorbent surface, it may be desirable to apply the plastic film to the card over the hole of one or both surfaces of the card to provide a better seating surface for the magnetic ink.

It should also be understood that a low cost film record can be formed by applying an adhesive coating to only one surface of the card around three edges of the aperture and spacing the coating from the edges of the aperture so that ledges are formed therearound. A film strip can then be mounted over the aperture on the ledges but beneath the protective enveloping member.

The index of refraction of polyethylene terephthalate films such as "Mylar" is about 1.64 to 1.67. We have discovered that for optimum results with respect to the reduction of distortion of an image on the microfilm negative during a projection or reproduction operation, and also with respect to sufficient strength of the enveloping members and minimum variations in thickness of the record cards for convenience in stacking and storing in piles and rows, the thickness of the polyethylene terephthalate enveloping members are desirably within the range of about 0.00032 to 0.00038 inch, more preferably from 0.00033 to 0.00037 inch and most preferably in the order of about 0.00035 inch.

As shown in FIGURE 3 an elongated light source such as a fluorescent bulb 26 may be utilized in a reproduction operation but it will be readily apparent that the light rays emanating therefrom are not all directed to the enveloping member 22 along lines parallel to a line normal to the enveloping member but at a variety of angles thereto. All of the light rays which are not normal to the surface of the enveloping member naturally tend to distort the reproduced image in some degree regardless of a relatively low index of refraction of the enveloping member.

In accordance with the principles of the invention in order to further reduce such distortion a coating of partially reflective material is applied to an external surface 22*a* of the enveloping member 22 interposed between the source of light and the film strip negative 20. Such partially reflective materials are known in the art, some of which are comprised of aluminum or ferric compounds.

We have determined that the coefficient of reflection of the coating, that is, the ratio of the intensity of the reflected radiation to that of the incident radiation at normal incidence, is important in obtaining optimum results and have discovered that the coating of reflective material should desirably have a coefficient of reflectance between the range of about 35 and 45 percent and most preferably should be in the order of about 40 percent. By utilizing this criterion a sufficient number of light rays are transmitted through the enveloping members and the film strip negative to provide sufficient brightness, but distortion due to refraction is maintained within limits such that the projected or reproduced image has a high degree of clarity and definiteness.

Thus, in accordance with the principles of this invention placing the photosensitive members in contact with the surfaces of the enveloping members having a thickness and an index of refraction within the ranges noted heretofore, a very satisfactory image can be transferred to the unexposed photosensitive member. Still further, the enveloping members sandwiched between the photosensitive members, in addition to having the optical properties previously mentioned, may be coated with the partial reflective material such that undesirable light rays will not be permitted to pass therethrough, with the result that the image transferred to the unexposed film may be superior in clarity or contrast or the like to the image contained on the negative. Such a feature cannot be attained with any other known contact printing process. In this connection, it should also be observed that the process can be reversed and the unexposed photosensitive member could be carried within the film pocket so that an image could be transferred thereto by placing an image carrying photosensitive member over one of the enveloping members and passing a light therethrough.

It will be understood that a film record card constructed in accordance with the principles of our invention will have a wide variety of uses but it should be kept in mind that one of the primary features of our invention relates to record cards which, although capable of varied applications, are adapted particularly to film copying and projection operations.

It should also be understood that the illustrated embodiments of our invention have been used for illustrative purposes only and that various modifications and variations in the invention may be effected without departing from the spirit and scope of the novel concepts thereof.

We claim as our invention:

1. A film record card comprising:
   - a card having an aperture formed therein,
   - a pair of transparent enveloping members made of polyethylene terephthalate overlying said aperture and secured to said card on opposite sides of the card for providing a pocket therebetween in said aperture to receive a translucid film and to maintain the film in coplanar relation with said card, and
   - a coating of reflective material applied to the external surface of at least one of said enveloping members and having the property of partially reflecting light rays directed toward said external surface.

2. A film record card comprising:
   - a card having an aperture formed therein,
   - a pair of transparent enveloping members made of polyethylene terephthalate overlying said aperture and secured to said card on opposite sides of the card for providing a pocket therebetween in said aperture to receive a translucid film and to maintain the film in coplanar relation with said card, and
   - a coating of reflective material applied to the external surfaces of said enveloping members said coating having a coefficient of reflection of between about 35 percent and 45 percent.

3. A film record card comprising:
   - a card having an aperture formed therein,
   - a pair of transparent enveloping members overlying said aperture and secured to said card on opposite sides of the card for providing a pocket therebetween in said aperture to receive a translucid film and to maintain the film in coplanar relation with said card,
     - said enveloping members each having a thickness and an index of refraction such that a light ray directed theretoward will be displaced therethrough in a direction parallel thereto a distance no greater than 0.0333 millimeter from said line, and
   - a coating of reflective material applied to the external surfaces of said enveloping members said coating having a coefficient of reflection of about 40 percent.

References Cited by the Examiner

UNITED STATES PATENTS

| | | | |
|---|---|---|---|
| 2,775,050 | 12/1956 | Ellsworth | 40—159 |
| 2,843,955 | 7/1958 | Engelstein | 40—158 |
| 2,952,930 | 9/1960 | Hartle et al. | 40—158 X |
| 3,019,579 | 2/1962 | Heckman | 40—158 X |
| 3,195,257 | 7/1965 | Weihe | 40—158 |

JEROME SCHNALL, *Primary Examiner.*

EUGENE R. CAPOZIO, *Examiner.*

WENCELSO J. CONTRERAS, *Assistant Examiner.*